(12) United States Patent
Huang et al.

(10) Patent No.: US 7,375,967 B2
(45) Date of Patent: May 20, 2008

(54) PORTABLE ELECTRONIC DEVICE AND HEAT-DISSIPATION METHOD AND BATTERY CHARGER THEREOF

(75) Inventors: Yi-Chang Huang, Taipei County (TW); Yao-Chung Lin, Taipei County (TW)

(73) Assignee: High Tech Computer, Corp., Taoyuan (TW)

( * ) Notice: Subject to any disclaimer, the term of this patent is extended or adjusted under 35 U.S.C. 154(b) by 107 days.

(21) Appl. No.: 11/285,073

(22) Filed: Nov. 23, 2005

(65) Prior Publication Data

US 2006/0232929 A1     Oct. 19, 2006

(30) Foreign Application Priority Data

Apr. 15, 2005   (TW) ............................... 94111985 A (51) Int. Cl.
*H05K 7/20* (2006.01)
*H01L 23/36* (2006.01)

(52) U.S. Cl. ............... 361/707; 361/687; 361/689; 361/710; 165/80.3; 165/104.33; 165/185; 320/104; 320/107; 320/109

(58) Field of Classification Search ............... 361/676, 361/679, 686, 687, 688–695, 704–727; 257/718, 257/719, 722, 727; 174/15.1, 15.2, 16.3; 165/80.3, 104.33, 185, 104.21; 29/832, 841, 29/854; 713/300, 322; 320/114, 115
See application file for complete search history.

(56) References Cited

U.S. PATENT DOCUMENTS

| 5,898,569 | A | * | 4/1999 | Bhatia ........................ 361/700 |
|---|---|---|---|---|
| 5,946,191 | A | | 8/1999 | Oyamada |
| 6,034,874 | A | | 3/2000 | Watanabe |
| 6,084,769 | A | | 7/2000 | Moore et al. |
| 6,172,871 | B1 | * | 1/2001 | Holung et al. ............... 361/687 |
| 6,181,553 | B1 | | 1/2001 | Cipolla et al. |
| 6,219,233 | B1 | * | 4/2001 | Moore et al. ................ 361/687 |
| 6,275,945 | B1 | * | 8/2001 | Tsuji et al. .................. 713/300 |
| 6,313,987 | B1 | * | 11/2001 | O'Connor et al. ........... 361/687 |
| 6,343,010 | B1 | * | 1/2002 | Tanaka ........................ 361/687 |
| 6,362,959 | B2 | * | 3/2002 | Tracy .......................... 361/687 |
| 6,459,575 | B1 | * | 10/2002 | Esterberg .................... 361/687 |
| 6,601,179 | B1 | * | 7/2003 | Jackson et al. ............. 713/322 |
| 6,711,014 | B2 | * | 3/2004 | Anzai et al. ................ 361/687 |
| 6,837,058 | B1 | * | 1/2005 | McEuen et al. ............... 62/3.2 |
| 7,081,686 | B2 | * | 7/2006 | Yang ........................... 290/1 R |
| 7,116,554 | B2 | * | 10/2006 | Lee et al. .................... 361/695 |
| 2002/0181201 | A1 | * | 12/2002 | Liu et al. .................... 361/687 |

FOREIGN PATENT DOCUMENTS

| CN | 1195264 | | 10/1998 |
|---|---|---|---|
| CN | 1237056 | | 12/1999 |
| JP | 406150978 A | * | 5/1994 |
| JP | 02005039019 A | * | 2/2005 |

* cited by examiner

*Primary Examiner*—Michael V Datskovskiy
(74) *Attorney, Agent, or Firm*—Birch, Stewart, Kolasch & Birch, LLP (57) ABSTRACT

A heat-dissipation method comprises providing a heat-transfer module and a heat-dissipation module, wherein the heat-transfer module is disposed in a portable electronic device, and the heat-dissipation module is disposed in a battery charger. The heat-dissipation module then contacts the heat-transfer module to remove heat from the electronic device via conduction. Finally, the heat-dissipation module dissipates heat via conduction or convection.

21 Claims, 13 Drawing Sheets

PORTABLE ELECTRONIC DEVICE AND HEAT-DISSIPATION METHOD AND BATTERY CHARGER THEREOF

BACKGROUND

The invention relates to a portable electronic device and a heat-dissipation method thereof, and more particularly to a heat-dissipation method dissipating heat via a battery charger.

When a portable electronic device (for example, a personal digital assistant or a cell phone) is charged, heat produced by chips is transferred to the battery, light emitting elements or other electronic elements therein via circuit board, and raises the temperature thereof. This can damage electronic elements and shorten product lifespan. Battery charging generates a high temperature that may cause a battery (for example, lithium battery) to explode. Specifically, an inner temperature of the portable electronic device is raised when the device engages in wireless network communication or other operation with high energy consumption in charging.

SUMMARY

An embodiment of a heat-dissipation method comprises providing a heat-transfer module and a heat-dissipation module, wherein the heat-transfer module is disposed in a portable electronic device, and the heat-dissipation module is disposed in a battery charger. The heat-dissipation module then contacts the heat-transfer module to remove heat from the electronic device via conduction. Finally, the heat-dissipation module dissipates heat via conduction or convection.

The invention lowers an inner temperature of the portable electronic device, extends the lifespan thereof, and prevents an explosion of the battery.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The invention will be more fully understood from the following detailed description and the accompanying drawings, given by the way of illustration only and thus not intended to limit the invention.

FIG. 4a is a sectional view of the portable electronic device and the battery charger along direction A-A of FIG. 2a;

DETAILED DESCRIPTION

Figure 1:
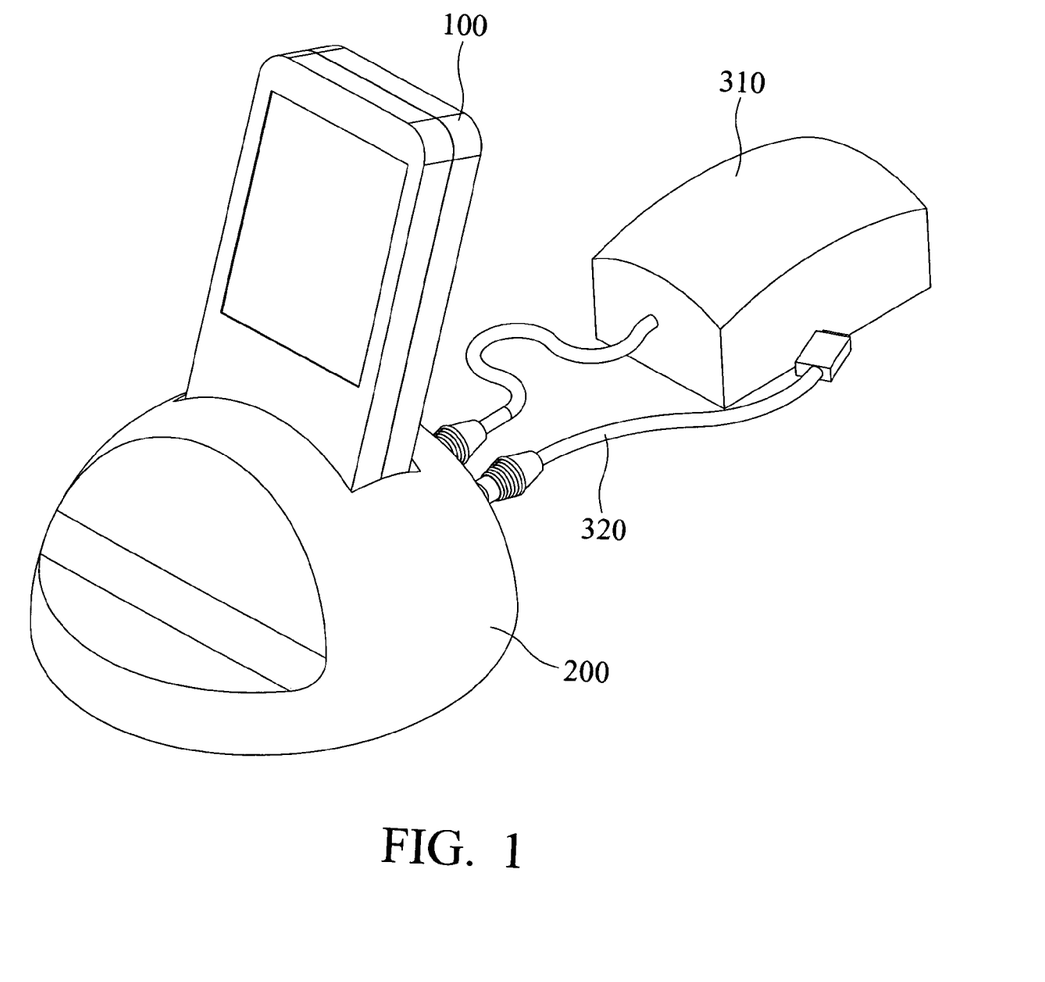
FIG. 1 shows a portable electronic device placed in a battery charger.

With reference to FIG. 1, a heat-dissipation module in the battery charger 200 dissipates heat from the portable electronic device 100, reduces the temperature therein, extends lifespan thereof, and prevents explosion of the battery when a portable electronic device (personal digital assistant) 100 is placed in a battery charger 200.

First Embodiment

Figure 2A:
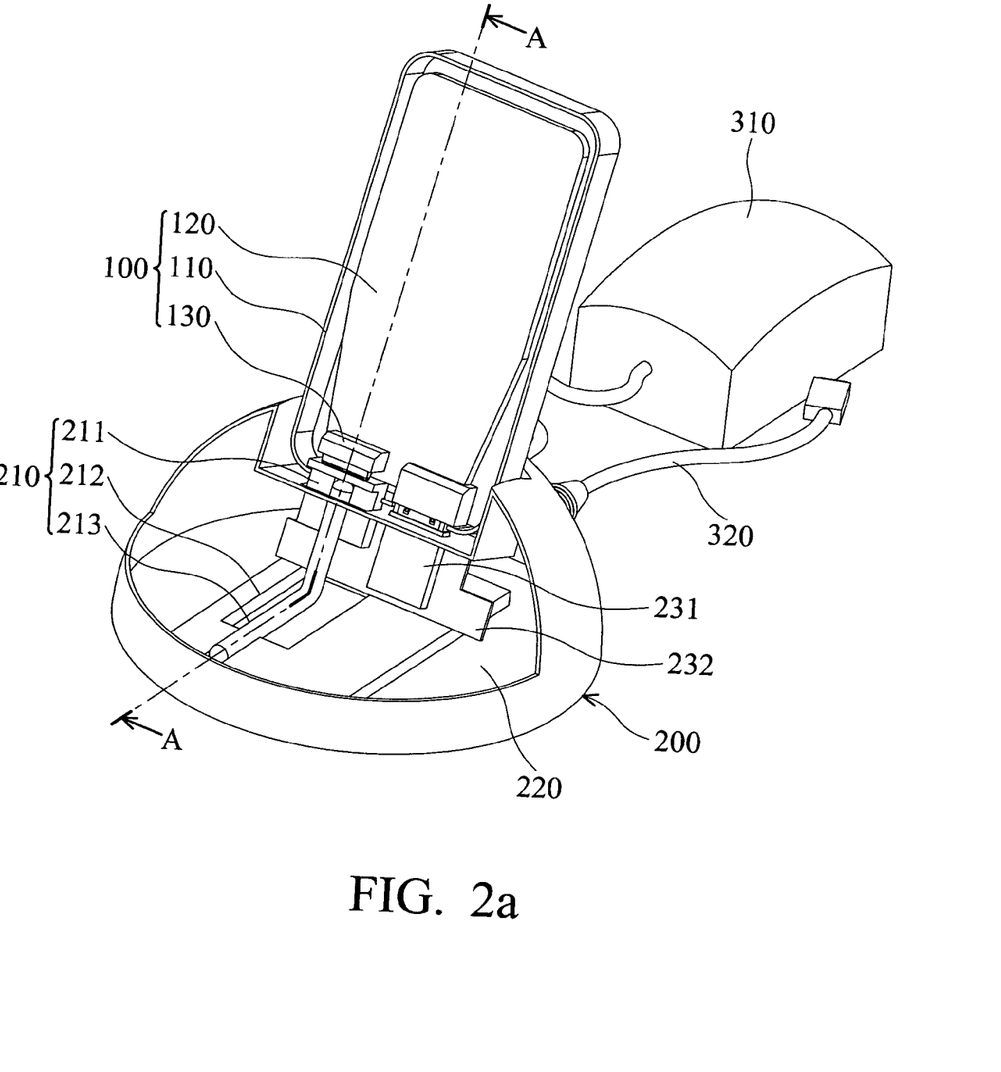
FIG. 2a shows inner structures of a portable electronic device and a battery charger of a first embodiment of the invention.
Figure 2B:
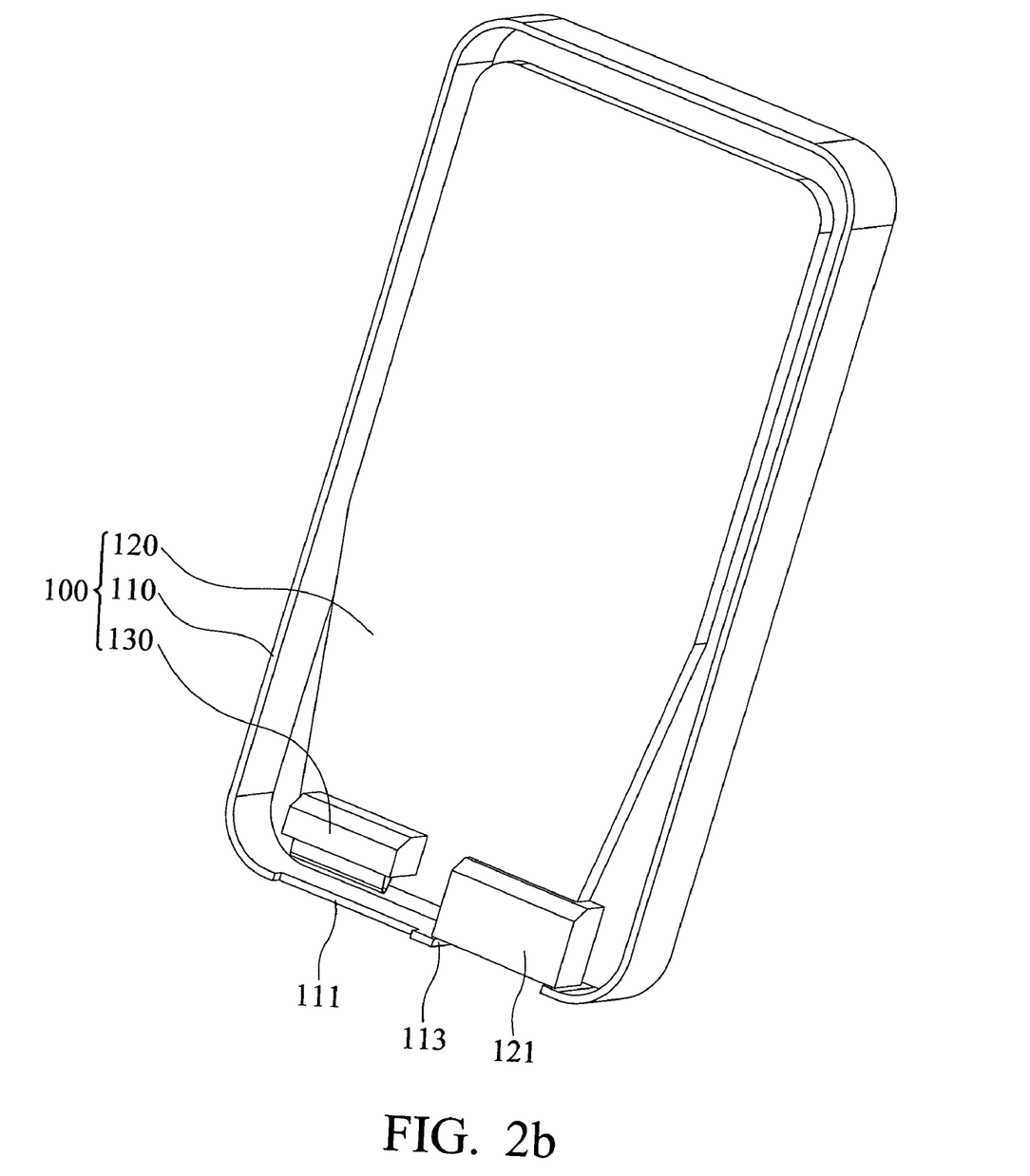
FIG. 2b shows an inner structure of the portable electronic device of the first embodiment of the invention.

FIG. 2a shows inner structures of a portable electronic device 100 and a battery charger 200 of a first embodiment of the invention. In the following, the portable electronic device 100 and the battery charger 200 are described respectively. As shown in FIG. 2b, the portable electronic device 100 comprises a housing 110, a first circuit board 120 and a heat-transfer module 130. The housing 110 comprises a first opening 111 and a third opening 113. The first circuit board 120 and the heat-transfer module 130 are disposed in the housing 110. The heat-transfer module 130 is disposed on an isolation region (a region with no circuit formed thereon) on the first circuit board 120 corresponding to the first opening 111. The first circuit board 120 comprises an universal serial bus (USB) port 121 corresponding to the third opening 113.

Figure 2C:
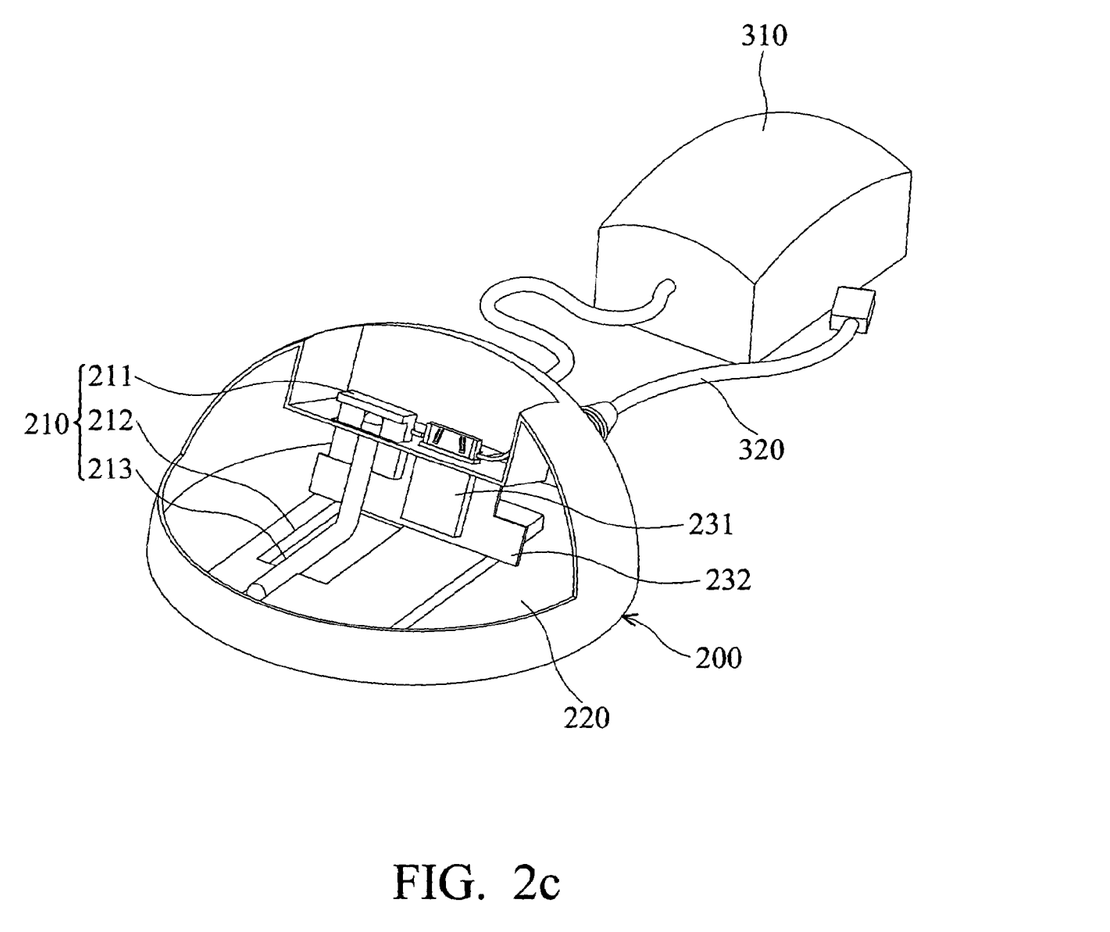
FIG. 2c shows an inner structure of the battery charger of the first embodiment of the invention.

As shown in FIG. 2c, the battery charger 200 comprises a heat-dissipation module 210, a chamber 220, a second circuit board 232, an universal serial bus (USB) plug 231, a commutator 310 and a data line 320. The heat-dissipation module 210 and the second circuit board 232 are disposed in the chamber 220. The second circuit board 232 and the USB plug 231 compose a charger module. The commutator 310 and the data line 320 are coupled to the second circuit board 232. The commutator 310 supplies charging power. The data line 320 transmits data signals. The USB plug 231 is coupled to the second circuit board 232. The charging power and the data signals are transferred to the portable electronic device 100 via the USB plug 231. The heat-dissipation module 210 comprises a heat-transfer element 211, a heat-dissipation element 212 and a heat pipe 213. The heat pipe 213 comprises a vaporizing end and a condensing end. The heat-transfer element 211 contacts the vaporizing end, and the heat-dissipation end 212 contacts the condensing end. The heat-transfer element 211 is L-shaped and comprises copper. The heat-dissipation element 212 comprises copper.

In a modified example, the commutator 310 can also be eliminated from the battery charger 200, and the battery charger 200 receives electric power and data signals through the data line 320.

Figure 3:
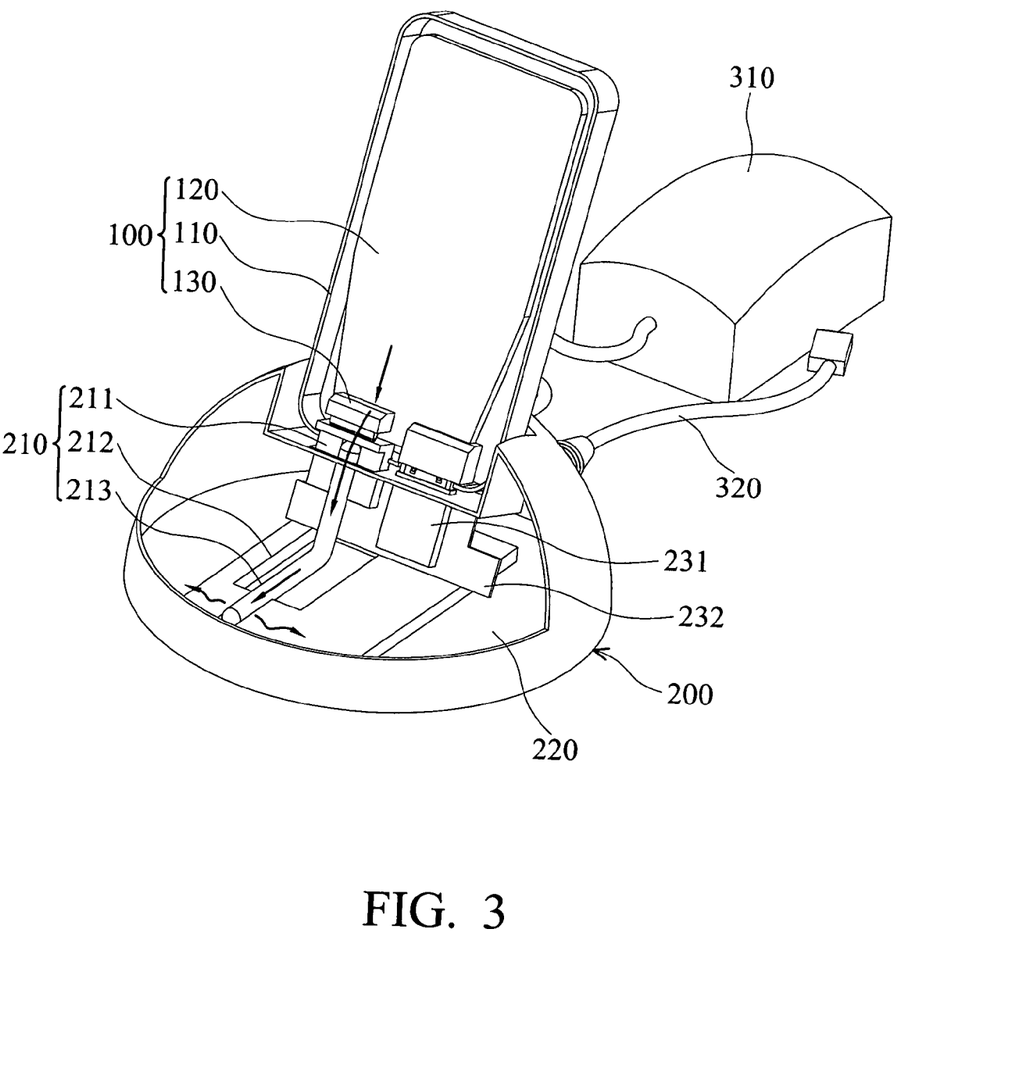
FIG. 3 shows heat dissipated by the first embodiment of the invention.

With reference to FIG. 3, the USB plug 231 is connected to the USB port for supplying electric power when the portable electronic device 100 is disposed on the battery charger 200. As shown by the arrow in FIG. 3, heat of the first circuit board 120 passes the heat-transfer module 130, the heat-transfer element 211 and the heat pipe 213, and is transferred to the heat-dissipation element 212. The inner temperature of the portable electronic device 100 is thus reduced.

Figure 4A:
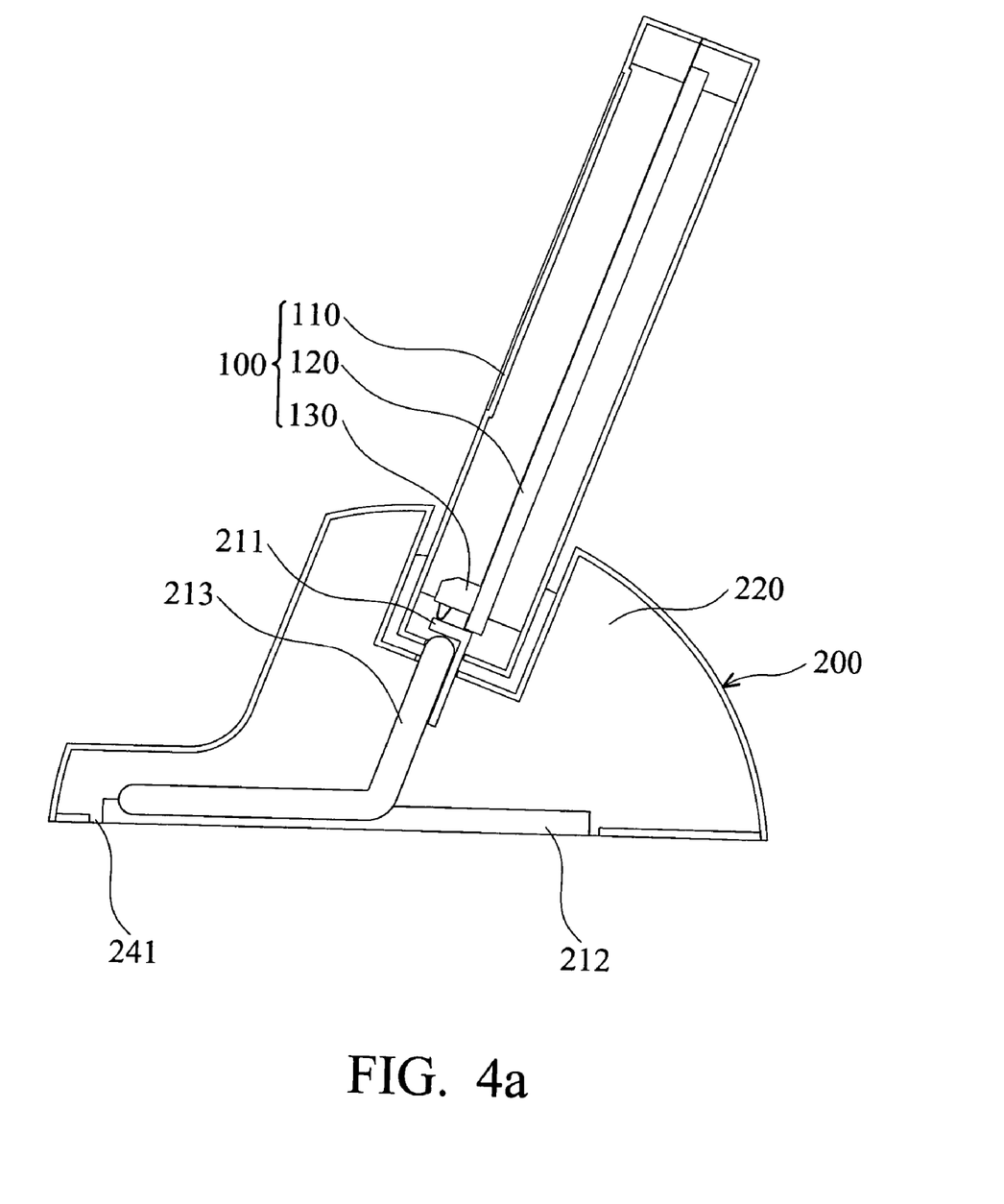

FIG. 4a is a sectional view of the portable electronic device 100 and the battery charger 200 along the direction A-A of FIG. 2a, wherein the heat-transfer element 211 is inserted into the housing 110 through the first opening. The heat-transfer module 130 abuts the heat-transfer element 211 by the weight of the portable electronic device 100, and transfers heat via conduction.

Figure 4B:
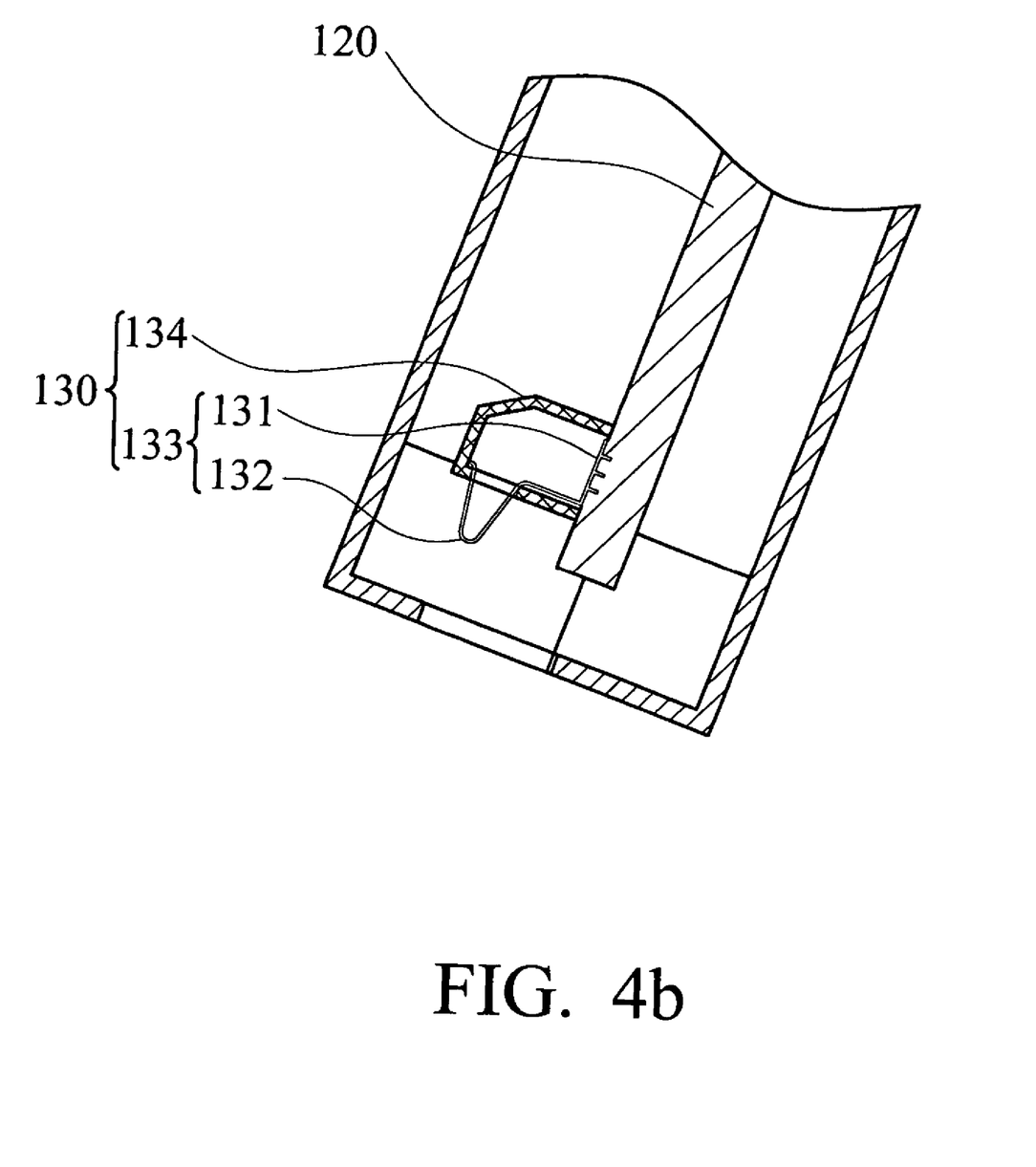
FIG. 4b shows a heat-transfer module and nearby structure of the first embodiment of the invention.

FIG. 4b shows the heat-transfer module 130 and nearby structures. The heat-transfer module 130 comprises a metal sheet 133 and a housing 134. The metal sheet 133 is partially disposed in the housing 134. The metal sheet 133 is made of copper, and comprises a first portion 131 and a second portion 132. The second portion 132 is a U-shaped elastic structure. In a first position, the second portion 132 does not contact the heat-transfer element. The first portion 131 contacts the first circuit 120, transferring heat therefrom.

Figure 4C:
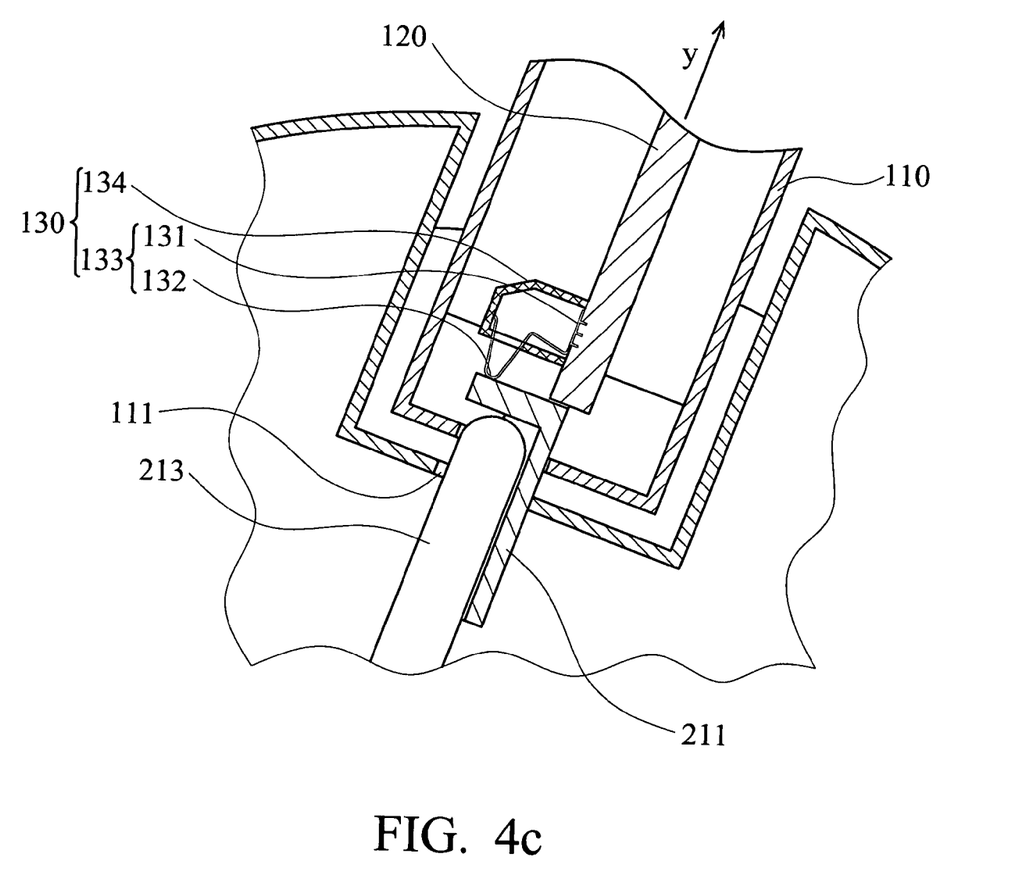
FIG. 4c shows the heat-transfer module abutting a heat-transfer element of the first embodiment of the invention.

As shown in FIG. 4c, when the portable electronic device is placed on the battery charger, the heat-transfer element 211 is inserted into the housing 110 through the first opening 111 in a first direction y (an insertion direction of the first opening 111). The second portion 132 is moved to a second position in the first direction y by the weight of the portable electronic device when the second portion 132 abuts the heat-transfer element 211. The second portion 132 sufficiently contacts the heat-transfer element 211, and heat of the first circuit board 120 passes the first portion 131 and the second portion 132 to the heat-transfer element 211 via conduction.

Figure 4D:
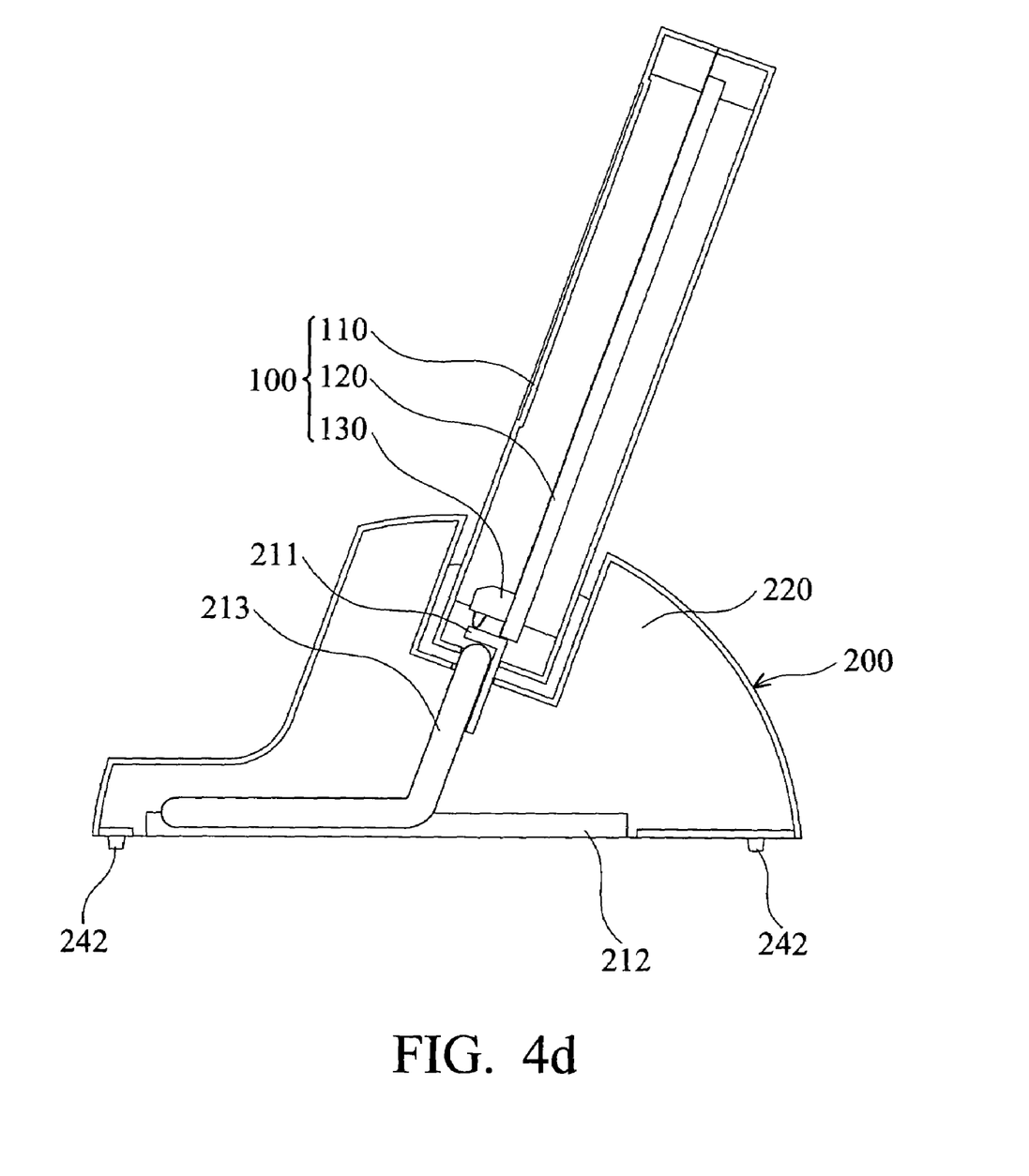
FIG. 4d shows a modified example of the first embodiment of the invention.

As show in FIG. 4a, a second opening 241 is formed at the bottom of the chamber 220. The heat-dissipation element 212 is disposed in the second opening 241. The heat-dissipation element 212 thus contacts a supporting surface (for example, table surface) for dissipating heat via conduction. As shown in FIG. 4d, a protrusion structure 242 can be further disposed on the bottom of the battery charger 200. Thus, the heat-dissipation 212 contacts external air, and dissipates heat via convection. The heat-dissipation element 212 increases the weight of the battery charger 200 and improves stability thereof.

Second Embodiment

Figure 5A:
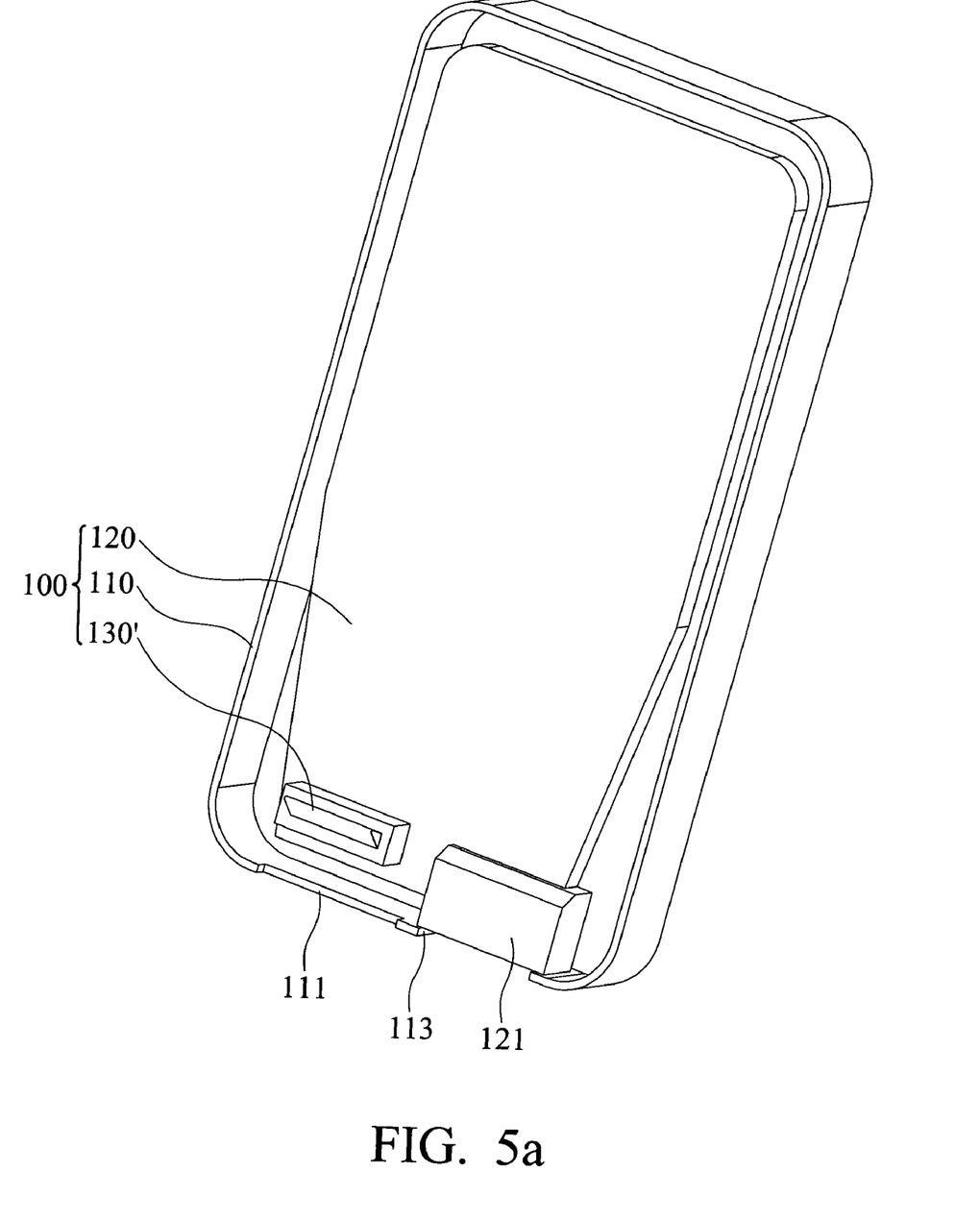
FIG. 5a shows an inner structure of a portable electronic device of the second embodiment of the invention.
Figure 5B:
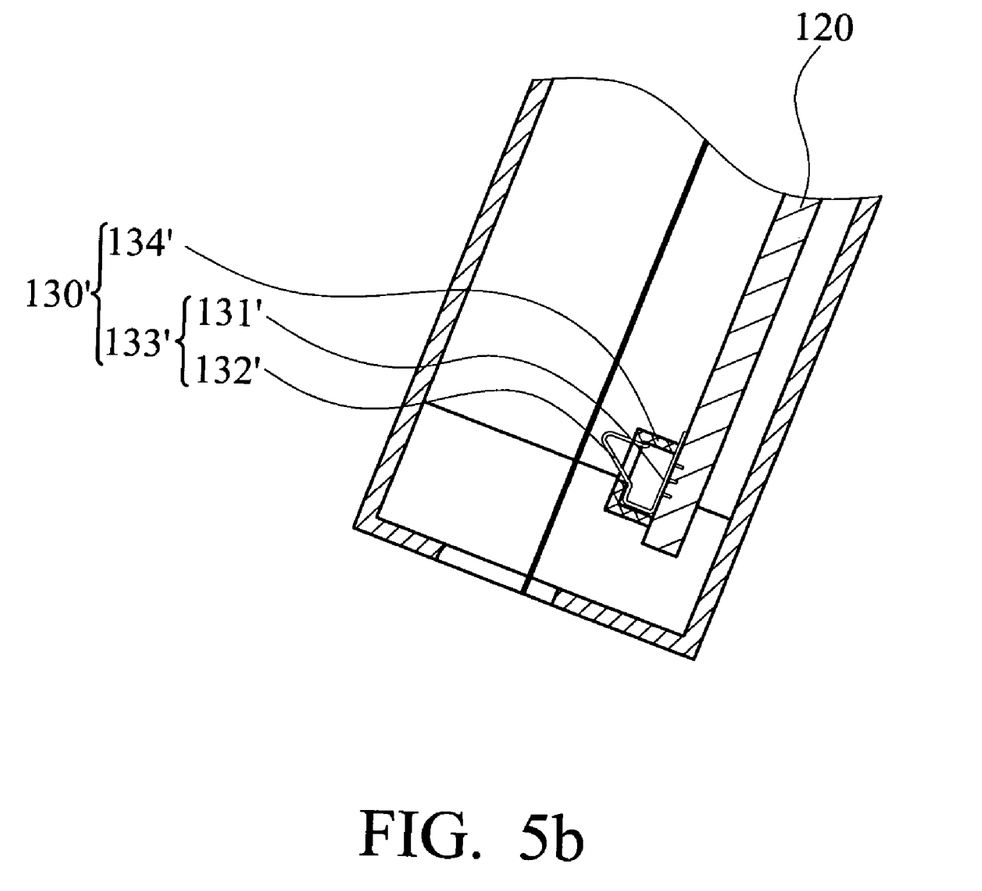
FIG. 5b shows a heat-transfer module and nearby structure of the second embodiment of the invention.

FIG. 5a shows a second embodiment of the invention, which differs from the first embodiment in the heat-transfer module 130'. FIG. 5b shows the heat-transfer module 130 and nearby structures. In the second embodiment, the first circuit board 120 nears a back side of the portable electronic device. The heat-transfer module 130' comprises a metal sheet 133' and a housing 134'. The metal sheet 133' is partially disposed in the housing 134'. The metal sheet is of copper, and comprises a first portion 131' and a second portion 132'. The second portion 132' is an elastic structure. When the second portion 132' is in a first position, it does not contact the heat-transfer element. The first position 131' contacts the first circuit board 120' and transmits heat therefrom.

Figure 5C:
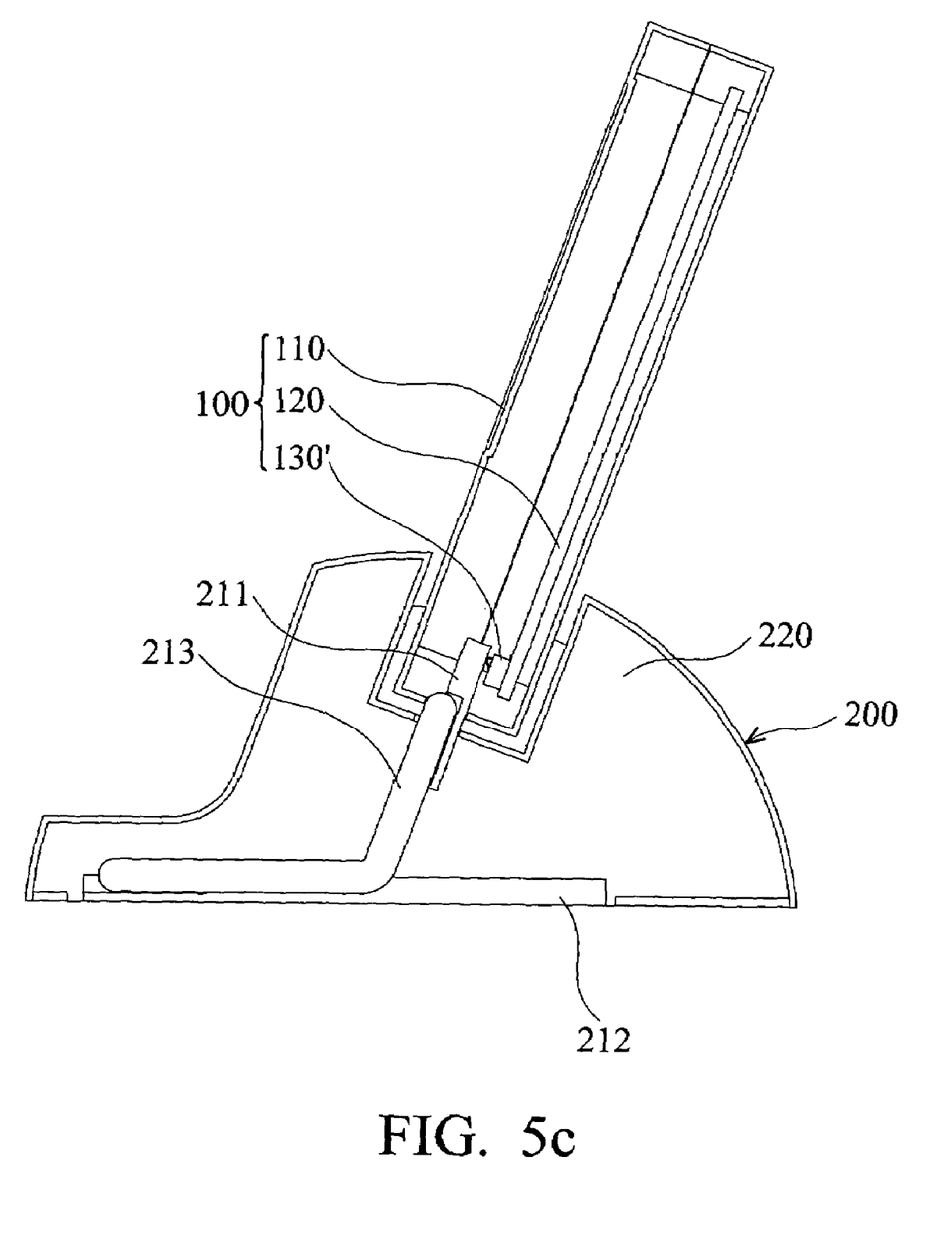
FIG. 5c shows the portable electronic device of the second embodiment placed in a battery charger.
Figure 5D:
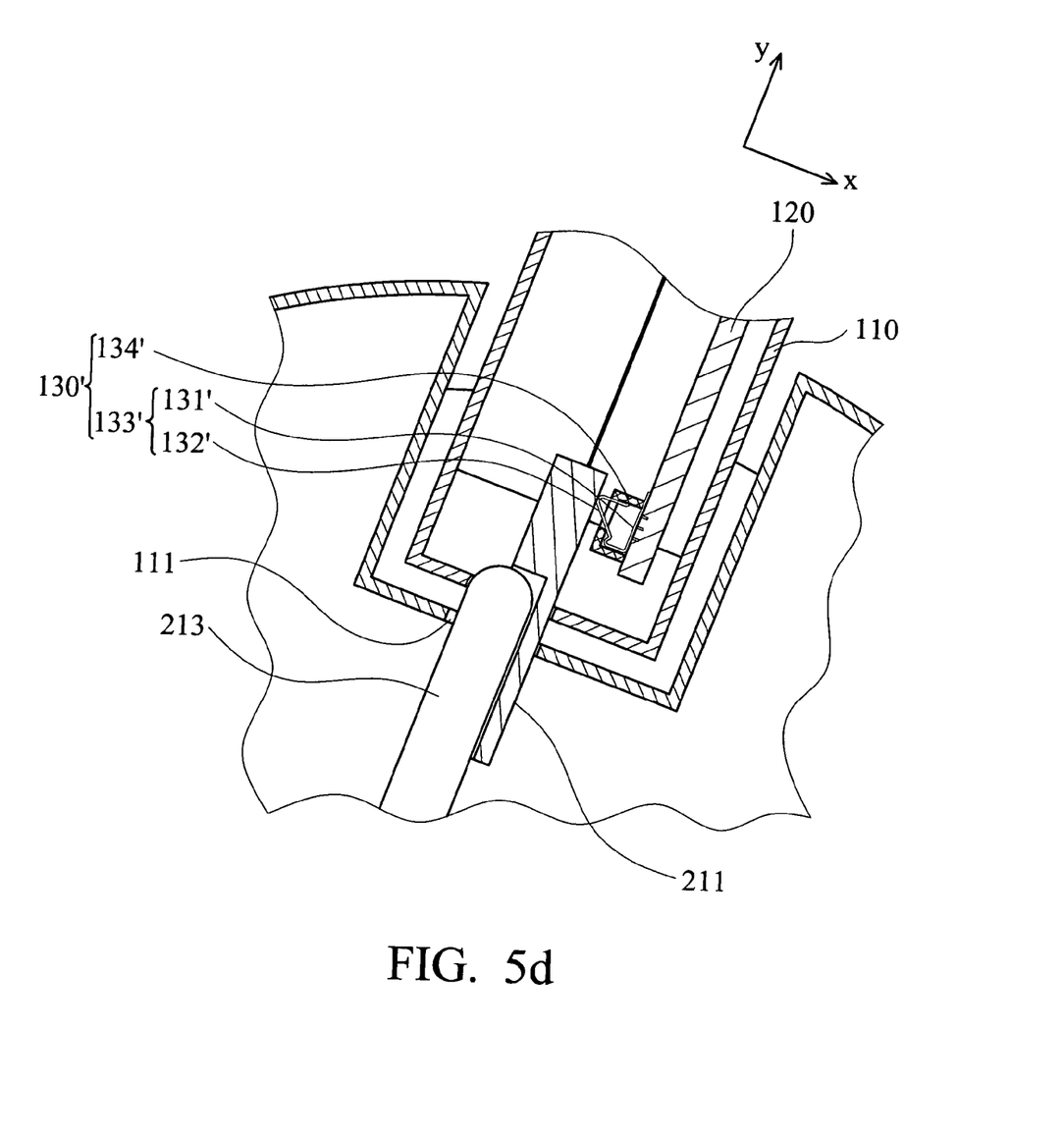
FIG. 5d shows the heat-transfer module abutting a heat-transfer element of the second embodiment of the invention.

With reference to FIG. 5c, when the portable electronic device 100 is placed in the battery charger 200, the second portion 132' abuts the heat-transfer element 211 via elastic force. With reference to FIG. 5d, the heat-transfer element 211 is inserted into the housing 110 through the first opening 111 in a first direction y (an insertion direction of the first opening 111), and the second portion 132' is moved to a second position in a second direction x. The second direction x is perpendicular to the first direction y. Heat is transferred from the first circuit board 120, passing the first portion 131' and the second portion 132' to the heat-transfer element 211 via conduction.

The invention lowers an inner temperature of the portable electronic device, extends lifespan thereof, and prevents explosion of the battery.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A portable electronic device, comprising:
   a housing, comprising a first opening;
   a first circuit board, disposed in the housing; and
   a heat-transfer module, comprising a metal sheet disposed on the first circuit board,
   wherein the metal sheet comprises a first portion and a second portion, the first portion contacts the first circuit board, the second portion is an elastic structure located in the first opening, and heat in the portable electronic device is removed via the heat-transfer module.

2. The portable electronic device as claimed in claim 1, wherein the first circuit board comprises an isolation region, and the heat-transfer module is disposed thereon.

3. The portable electronic device as claimed in claim 1, wherein the first portion is inserted into the first circuit board.

4. The portable electronic device as claimed in claim 1, wherein the second portion is U-shaped.

5. The portable electronic device as claimed in claim 1, wherein when a force is applied on the second portion, the second portion is recoverable moved in a first direction parallel to an insertion direction of the first opening.

6. The portable electronic device as claimed in claim 1, wherein when a force is applied on the second portion, the second portion is recoverably moved in a second direction perpendicular to an insertion direction of the first opening.

7. The portable electronic device as claimed in claim 1, wherein the metal sheet comprises copper.

8. A heat-dissipation method, comprising:
   providing a portable electronic device as claimed in claim 1 and a heat-dissipation module;
   contacting the heat-dissipation module to the second portion, for removing heat from the portable electronic device; and
   dissipating heat through the heat-dissipation module via convection or conduction.

9. A heat-dissipation method, comprising:
   providing a portable electronic device as claimed in claim 1 and a battery charger, wherein the battery charger comprises a heat-dissipation module;
   contacting the heat-dissipation module to the second portion, for removing heat from the portable electronic device; and
   dissipating heat through the heat-dissipation module via convection or conduction.

10. A battery charger for charging a portable electronic device, comprising:
    a chamber, comprising a second opening;

a heat-dissipation module, disposed in the second opening of the chamber, comprising a heat-transfer element, a heat pipe and a heat-dissipation element, wherein the heat-transfer clement contacts the heat pipe, and the heat pipe contacts the heat-dissipation element; and a charger module, disposed in the chamber, wherein the heat-transfer element and the charger module contact the portable electronic device simultaneously.

11. The battery charger as claimed in claim 10, wherein the heat-transfer element is L-shaped.

12. The battery charger as claimed in claim 10, wherein the heat pipe comprises a vaporizing end and a condensing end, the vaporizing end contacts the heat-transfer clement, and the condensing end contacts the heat-dissipation element.

13. The battery charger as claimed in claim 10, wherein the heat-dissipation element is disposed at the bottom of the chamber.

14. The battery charger as claimed in claim 10, wherein the second opening is formed at the bottom of the chamber.

15. The battery charger as claimed in claim 14, further comprising at least one protrusion, disposed at the bottom thereof.

16. The battery charger as claimed in claim 10, wherein the heat-transfer element comprises copper.

17. The battery charger as claimed in claim 10, wherein the heat-dissipation element comprises copper.

18. A heat-dissipation method, comprising:
providing a portable electronic device and a battery charger,
wherein the portable electronic device has a housing, a first circuit board and a heat-transfer module, the housing having a first opening, the first circuit board being disposed in the housing, and the heat-transfer module having a metal sheet disposed on the first circuit hoard, and wherein the metal sheet has a first portion and a second portion, the first portion contacts the first circuit board, the second portion is an elastic structure located in the first opening, and heat in the portable electronic device is removed via the heat-transfer module; and wherein the battery charger for charging the portable electronic device has a chamber, a heat-dissipation module, and a charger module, the chamber having a second opening, the heat-dissipation module being disposed in the second opening of the chamber and having a heat-transfer element, a heat pipe and a heat-dissipation element, the heat-transfer element contacting the heat pipe and the heat pipe contacting the heat-dissipation element, and the charger module being disposed in the chamber, and wherein the heat-transfer element and the charger module contact the portable electronic device simultaneously;

contacting the heat-dissipation module to the second portion, for removing heat from the portable electronic device; and dissipating heat through the heat-dissipation module via convection or conduction.

19. The heat-dissipation method as claimed in claim 18, wherein the heat-transfer element is inserted into the first opening.

20. The heat-dissipation method as claimed in claim 18, wherein the second portion abuts the heat-transfer element via gravity.

21. The heat-dissipation method as claimed in claim 18, wherein the second portion abuts the heat-transfer element via elastic force.

* * * * *